United States Patent
Bowers (10) Patent No.: US 6,564,651 B1
(45) Date of Patent: *May 20, 2003

(54) MODULAR HIGH-TEMPERATURE GAS FLOW SENSING ELEMENT FOR USE WITH A CYCLONE FURNACE AIR FLOW MEASURING SYSTEM

(76) Inventor: James R. Bowers, 19615 Lake Rd., Rocky River, OH (US) 44116

( * ) Notice: Subject to any disclaimer, the term of this patent is extended or adjusted under 35 U.S.C. 154(b) by 0 days.

This patent is subject to a terminal disclaimer.

(21) Appl. No.: 10/020,456

(22) Filed: Dec. 7, 2001

Related U.S. Application Data (63) Continuation-in-part of application No. 09/299,383, filed on Apr. 27, 1999, now abandoned.

(51) Int. Cl.⁷ .............................................. G01F 1/46
(52) U.S. Cl. .................................................. 73/861.66
(58) Field of Search ..................... 73/861.64, 861.65, 73/861.66

(56) References Cited

U.S. PATENT DOCUMENTS

| | | | | |
|---|---|---|---|---|
| 4,297,900 A | * | 11/1981 | Brandt, Jr. ............... | 73/861.66 |
| 4,594,888 A | * | 6/1986 | DeBaun et al. ............... | 73/198 |
| 4,768,386 A | * | 9/1988 | Taddeo ........................ | 73/147 |
| 5,481,925 A | * | 1/1996 | Woodbury ............... | 73/861.65 |
| 5,736,651 A | * | 4/1998 | Bowers .................... | 73/861.66 |

* cited by examiner

Primary Examiner—Harshad Patel
(74) Attorney, Agent, or Firm—John D. Gugliotta (57) ABSTRACT

A high temperature gas flow sensing element module, using Pitot tube technology, for use within a fluid conduit consisting of a housing having an inlet, an outlet, and forming a hollow interior cross-sectional area. Individually, the gas flow sensing element modules fit easily through typical furnace access doors. Thus, in typical furnace retrofit applications, a plurality of equally sized gas flow sensing element modules are arranged adjacent one another in a manner such that the inside dimensions of the entire arrangement coincide with the internal dimensions of the plenum or duct opening into which it is inserted. Pressure averaging piping is used to provide average total and static pressure across the entire gas flow sensing element to differential pressure flow indicators and/or transmitting devices.

9 Claims, 7 Drawing Sheets

MODULAR HIGH-TEMPERATURE GAS FLOW SENSING ELEMENT FOR USE WITH A CYCLONE FURNACE AIR FLOW MEASURING SYSTEM

RELATED APPLICATIONS

The present invention is a Continuation in Part of U.S. Ser. No. 09/299,383 filed on Apr. 27, 1999 now abandoned.

FIELD OF THE INVENTION

This invention relates to fluid flow sensing elements for measuring gas flow rates and, more specifically, to an area averaging Pitot tube arrangement, modular in design specifically adapted for use with a cyclone style furnace air flow element used for boiler combustion air measuring and control so as to provide an improved method of installation. It is useful in measuring gas flow rates in rectangular, irregular, or ducts having non-circular cross-sectional area and in high-temperature applications. It is particularly useful in the boiler combustion systems wherein furnace retrofit projects require replacement of the combustion air flow measuring element without damaging or altering significantly the furnace structure or duct work.

BACKGROUND OF THE INVENTION

The instrumentation and process control industry has recognized the use of the Pitot tube as a reliable device for measuring the volumetric flow of both liquids and gasses for many years. The Pitot tube operates based upon the principal that when a fixed probe is inserted into piping or duct work containing a moving fluid, the total pressure sensed by the probe is the sum of the static pressure exerted by the fluid, whether in motion or at rest, and the dynamic pressure equivalent to the kinetic energy of the fluid in motion. Conventional Pitot tube arrangements provide measurement of both the static and total pressure of the flowing fluid, the difference between which is the dynamic pressure. This differential pressure, i.e. the dynamic pressure, is directly related to and can be used to calculate the linear flow rate within the piping or duct work. The volumetric flow rate of the fluid is determined by multiplying the linear flow rate by the cross-sectional area of the conduit.

The Pitot tube is particularly useful in measuring gas flows in piping or duct work with a large cross-sectional area because they cause negligible pressure loss within the conduit. In application, it is well known that flow rates, and thus dynamic pressures, within a conduit are not uniform. Affected by variables such as the Reynolds number of the particular gas and turbulence caused by surface roughness, dampers, elbows and other fittings, the flow rate/dynamic pressure is generally higher toward the center of the conduit and lower towards the outer extremes. This phenomenon is described in terms of a velocity profile, wherein a vector representation of the linear velocities at various points within the conduit defines a characteristic profile curve. The dynamic nature of the velocity profile precludes accurate measurement with a single Pitot tube. Rather, an accurate measurement of the flow within the conduit is obtained by placing the Pitot tubes at various positions on a cross-sectional plane, sampling the dynamic pressure at various points across the velocity profile, averaging them, and using the result to calculate a volumetric flow rate.

Presently, area averaging Pitot tube arrays consist of a fluid flow element wherein an inlet and an outlet is provided having a housing with the same internal dimensions as the fluid conduit. An interior flow conditioner, affixed at the inlet of the flow element, helps to minimize turbulence and produce a more uniform velocity profile. A total pressure sensing Pitot tube array traverses the interior cross-sectional area of the flow element for sensing the total pressure of fluid flowing therethrough. A static pressure sensing Pitot tube array traverses the interior cross-sectional area of the flow element for sensing the average static pressure therein. Each Pitot tube array is equipped with a common header that serves to average the individual Pitot tube pressures. Exterior instrument taps, connected to the respective common headers, are provided for connection of each array to a differential pressure instrument for indicating flow rate and/or transmitting a flow rate signal. Using the aforementioned principles, this signal is used to calculate the volumetric flow rate through the element.

BRIEF SUMMARY OF THE INVENTION

According to the preferred embodiment of the present invention, an improved fluid flow element incorporating the use of area averaging Pitot tube arrays is provided. The element contains an inlet and an outlet in a housing with the same internal dimensions as that of the fluid conduit. The element also contains an interior flow conditioner and a bell mouth inlet to direct the flow into the element while minimizing entrance pressure drop at the inlet side of the element. The element is modular in construction so as to allow installation in furnace retrofit applications where the size of furnace access doors precludes the installation of a one-piece element. The element is comprised of equal sized sections, each of which is equipped with a total pressure Pitot tube array and a static pressure Pitot tube. The modular design allows for the use of shorter Pitot tubes, thus reducing undesirable effects of harmonic vibration and differential expansion caused by high fluid velocity and temperature, respectively. Common headers, equipped with individual instrument taps, allow for sectional flow measurement in each quadrant. Once the modules are installed, field piping is used to connect the total and static Pitot tube arrays, respectively, resulting in a single pair of instrument taps for flow determination across the entire element.

LIST OF REFERENCE NUMBERS

10 Fluid Flow Element Module
11 Inlet
12 Outlet
13 Housing
15 First Instrument Tap
16 Interior Flow Conditioner
17 Second Instrument Tap 20 Total Pressure Sensing Pitot Tubes
22 Static Pressure Sensing Pitot Tube
23 Total Pressure Manifold
24 Compression Tube Fitting
30 Fluid Flow Element
31 Seams
32 Instrument Piping
33 Pipe Fittings
34 Third Instrument Taps
35 Three-Way Valve

DETAILED DESCRIPTION OF THE PREFERRED EMBODIMENT

Figure 1:
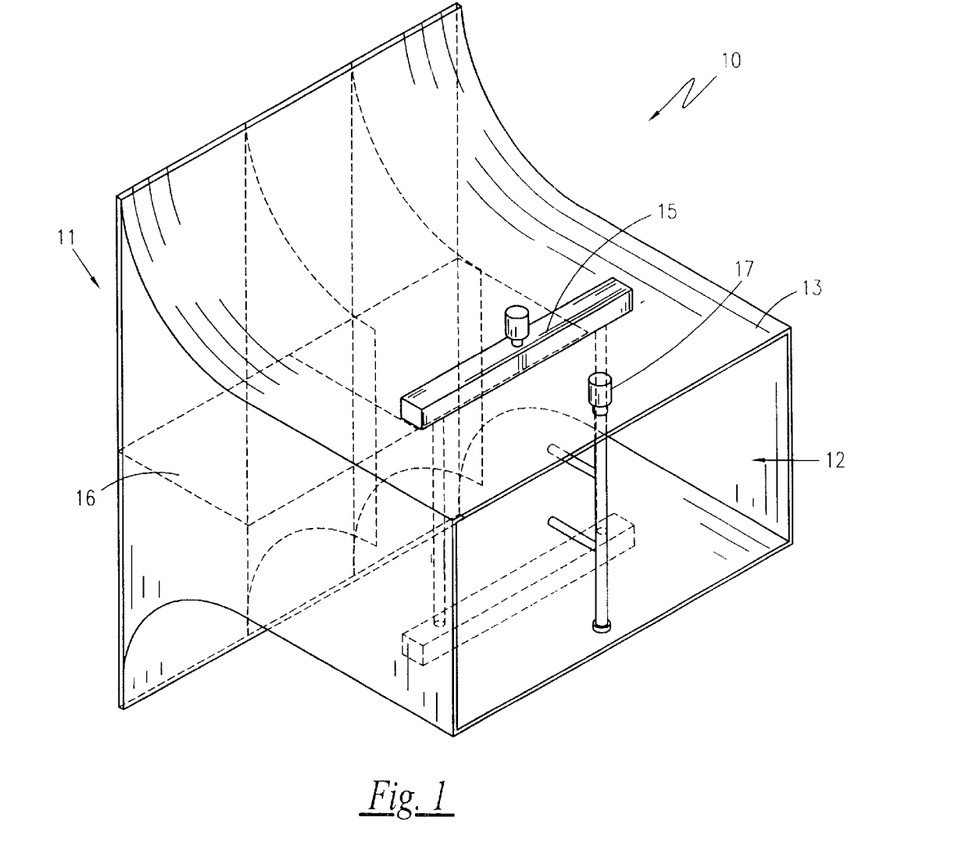
FIG. 1 is a side orthographic view of a flow element module, according to the present invention, for use with a rectangular fluid conduit.

As shown in FIG. 1, a fluid flow element module, generally noted as 10, according to one embodiment of the present invention is disclosed having a non-circular cross sectional inlet 11 in fluid communication with an outlet 12 mounted within a generally rigid housing 13. In its preferred embodiment, the housing 13 is made with the same vertical internal dimensions as the fluid conduit in which it is to be utilized, and as shown in this embodiment a rectangular housing 13 is provided. A first instrument tap 15 and a second instrument tap 17 are provided protruding outward from the housing 13, and will be described in greater detail below. An interior flow conditioner 16 is affixed at the inlet 11 of the fluid flow element module 10 in order; to reduce swirls and distortions in fluid flow patterns, commonly experienced with plenum inlet configurations, as an air or gas enters the flow element inlet 11. Such "flow straightening" is known to improve a fluid flow profile within the housing 13, thereby increasing reliable accuracy when the fluid flow element module 10 is utilized in plenum inlets which are unable to accommodate long straight flow runs upstream from the inlet 11. In applications involving a ducted inlet instead of a plenum inlet, an interior flow conditioner 16 is of less importance and, in some instances, can be eliminated.

Figure 2:
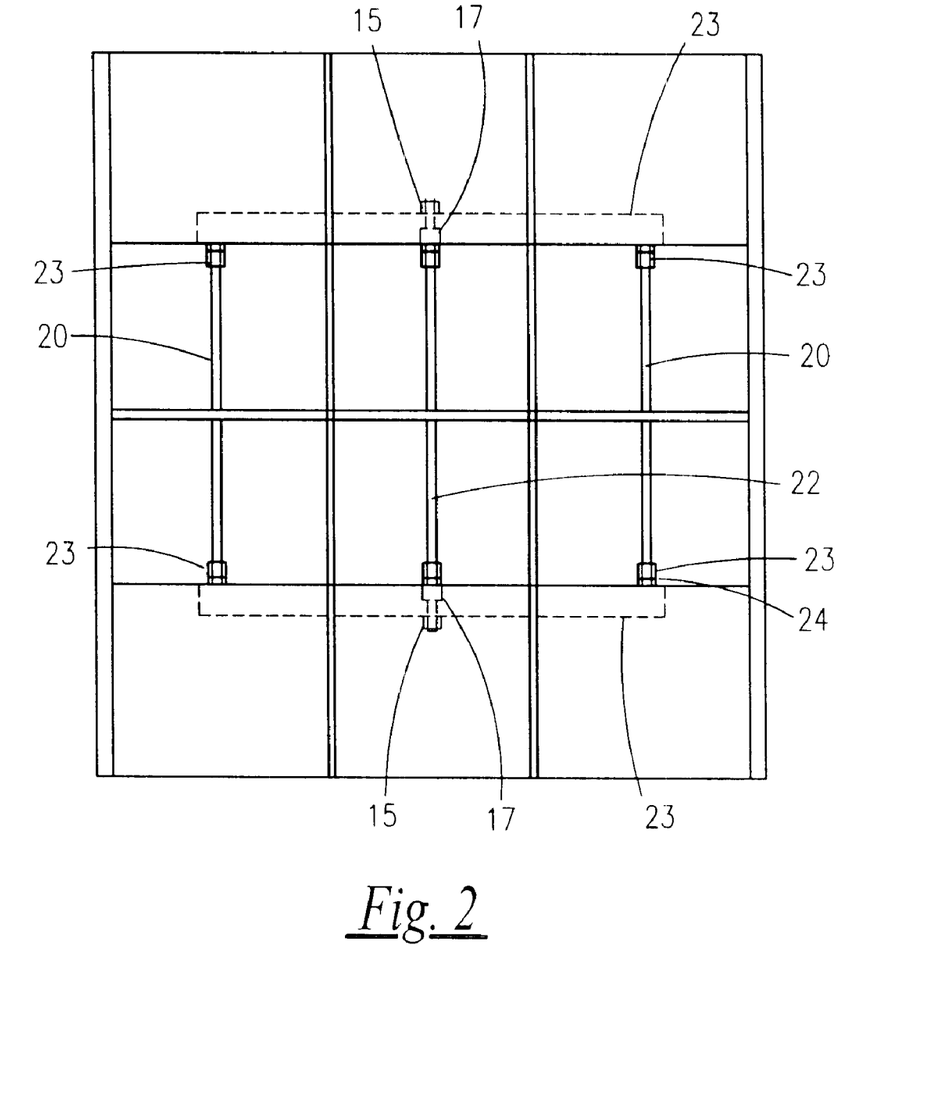
FIG. 2 is a front elevational view thereof.
Figure 3:
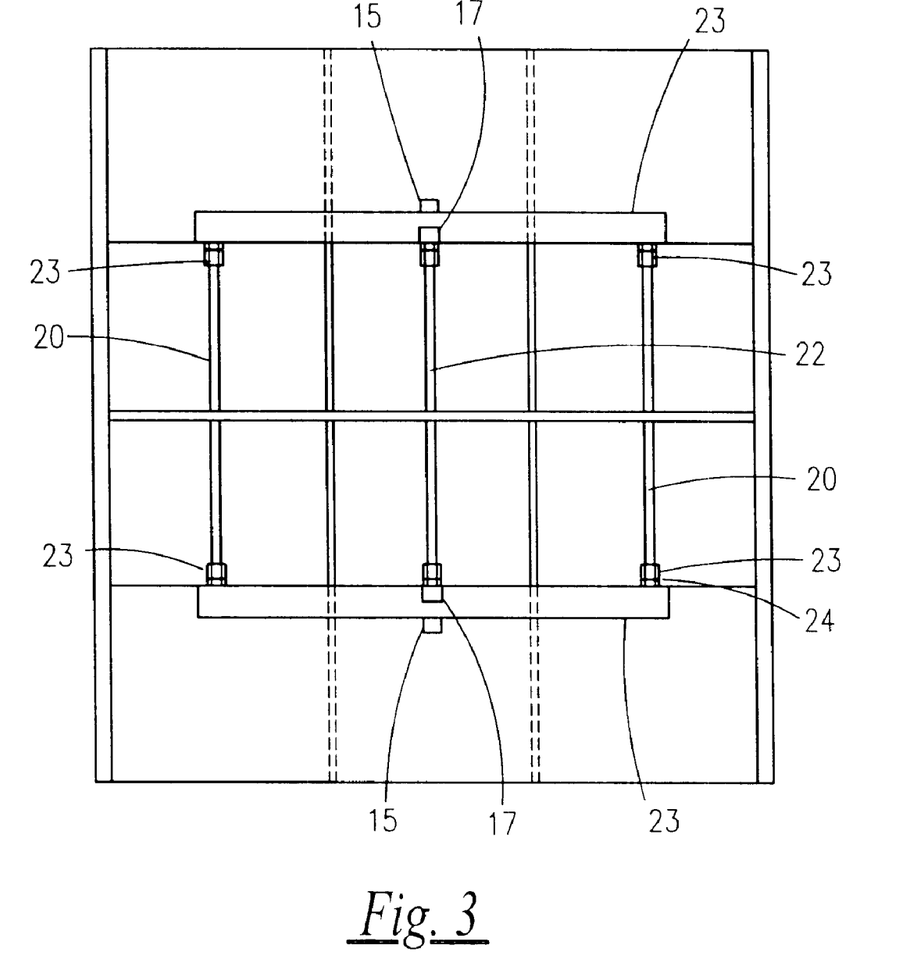
FIG. 3 is a rear elevational view thereof.

As shown more clearly in FIG. 2 and also in FIG. 3, total pressure sensing Pitot tubes 20 are affixed traversing the interior cross sectional area of fluid flow element module 10 for sensing the total pressure of fluid flowing into the fluid flow element module 10. Also, a static pressure sensing Pitot tube 22 is affixed traversing the interior cross sectional area of the flow element 10 for sensing the static pressure within the flow element. These Pitot tubes 20,22 will be more clearly described below. This arrangement allows for Pitot tube flow principles to be utilized, sensing the total pressure of the flowing gas with the total pressure sensing Pitot tubes and the static pressure within the conduit with the static pressure sensing Pitot tube.

Figure 4:
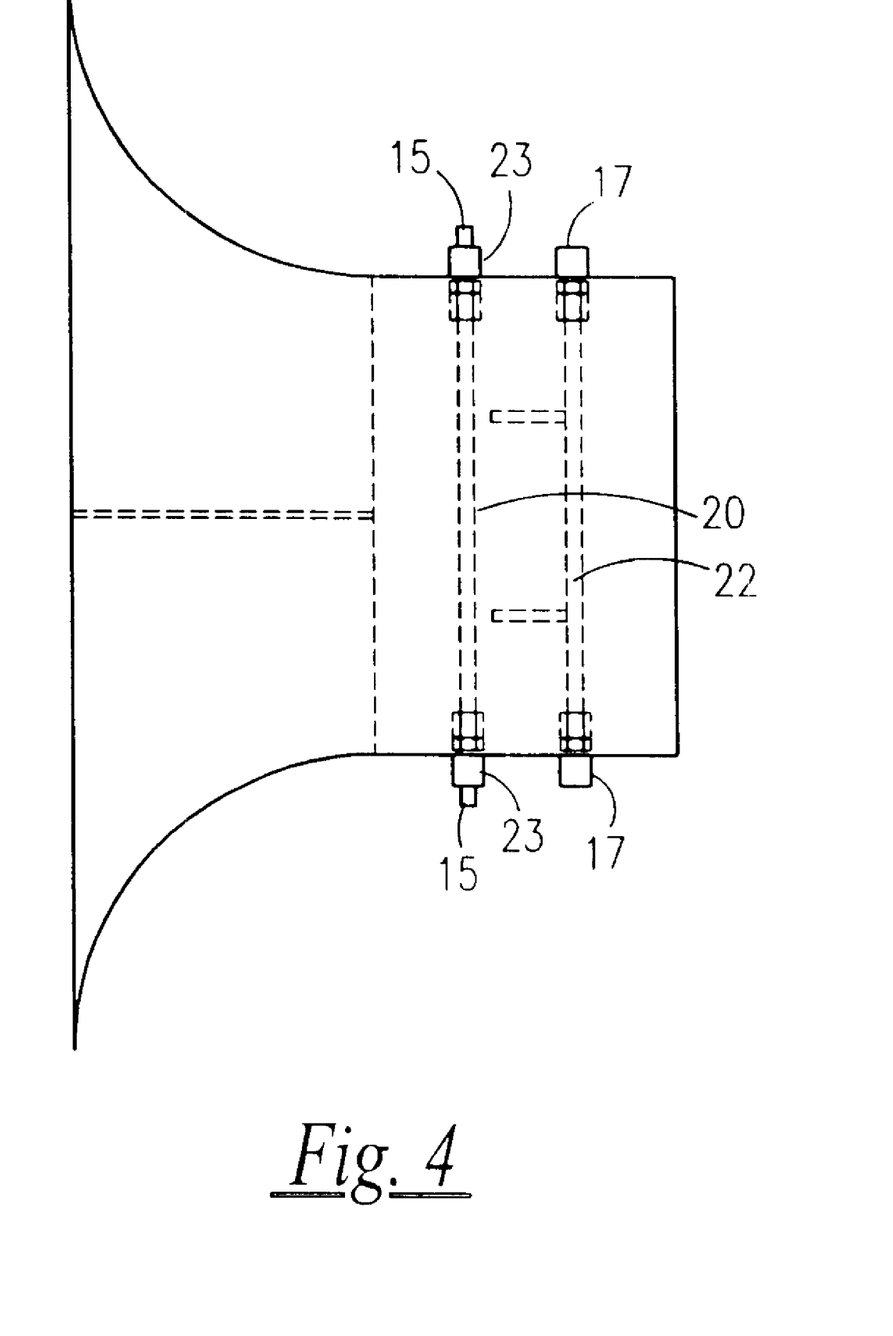
FIG. 4 is a side elevational view thereof.

As shown in FIG. 2, FIG. 3 and FIG. 4, first instrument taps 15 provide a connection to the total pressure Pitot tubes 20 through a total pressure manifold 23 and second instrument taps 17 provide a connection to the static pressure Pitot tube 22. These connections allow for the use of a differential pressure instrument for indicating flow rate and/or transmitting a flow rate signal.

As shown in FIG. 2 and FIG. 3, the total pressure sensing Pitot tubes 20 are arranged in fluid communication with and anchored to a total pressure manifold 23. Each Pitot tube is affixed to the total pressure manifold 23 in a conventional manner, herein depicted as a readily available compression tube fitting 24. Each Pitot tube 20 has a plurality of sensing ports (not shown) oriented so as to face directly toward the inlet 11, thereby providing unrestricted fluid communication between the impacting fluid flowing into the fluid flow element module 10, through the Pitot tubes 20, and to the total pressure manifold 23. The total pressure manifold 23 thereby consolidates this combined pressure and communicates it to the first instrument tap 15. The static pressure sensing Pitot tube 22 is also arranged in fluid communication with second instrument taps 17, and anchored in an otherwise conventional manner, herein depicted as a readily available compression tube fitting 24. In an alternate embodiment, a plurality of static pressure sensing tubes may also be arranged in a manner similar to that of the total pressure sensing Pitot tubes, incorporating a static pressure manifold. The static pressure sensing Pitot tube 22 has a plurality of sensing ports (not shown) oriented so as to face perpendicular to the gas flow through the fluid flow element module 10. This pressure is communicated through the Pitot tube to the second instrument taps 17. In terms of contrast, classic Pitot tubes consist of a concentric double tube, the inside tube having a port facing into the flowing stream for sensing total pressure and the outside tube having radially aligned holes for sensing static pressure.

As shown best in FIG. 2 and FIG. 3, the total pressure Pitot tubes 20 and the static pressure Pitot tube 22 are not placed randomly within the fluid flow element module 10. Rather, they are meticulously placed in a traversing manner. The total number and location of sensing ports (not shown) are positioned in accordance with formulas recommended by engineering standards organizations. Specifically, it has been found that by positioning the sensing ports according to the log-Tchebycheff rule or other formulas recommended by engineering standards organizations, rather than the older equal area method, greater accuracy can be achieved. The location of the sensing ports, determined by recognized engineering standards, take into account low velocity patterns at the duct or conduit walls, thereby minimizing the high-flow inaccuracies generated by Pitot array flow elements with sensing ports located using older, less accurate methods.

Figure 5:
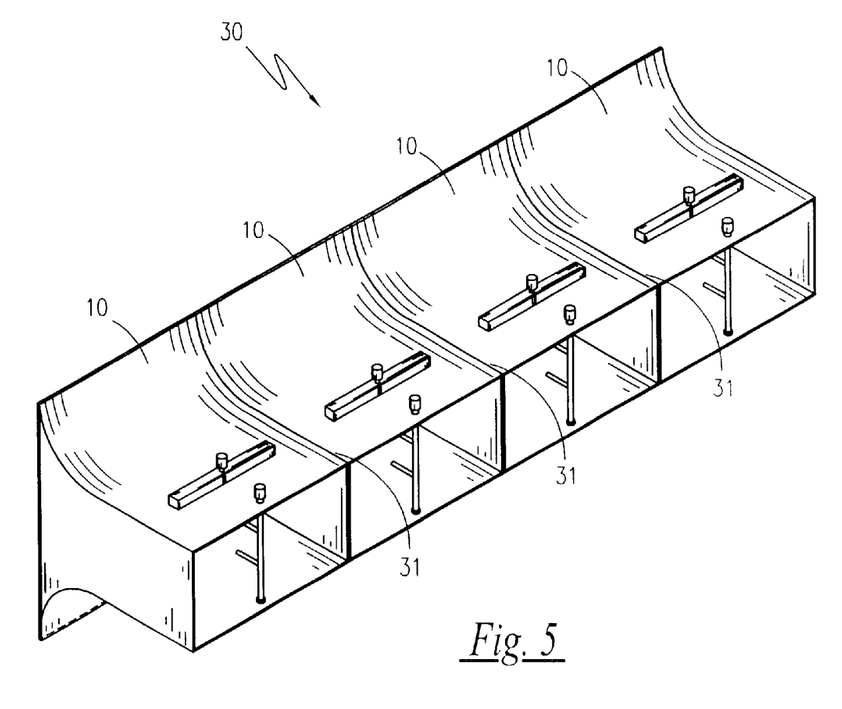
FIG. 5 is a side orthographic view of individual flow element modules, according to the present invention, arranged and joined for use with a rectangular fluid conduit.

As shown in FIG. 5, a fluid flow element 30 is comprised of a plurality of individual fluid flow element modules 10. The outside dimensions of the fluid flow element 30 are designed to match with the internal dimensions of the plenum or duct opening to which it is connected. By way of example, in a cyclone furnace installation, the outside dimensions of the fluid flow element 30 would be designed to match the inside dimensions of the secondary air flow inlet. The seams 31 between the fluid flow element modules 10 are sealed in an appropriate manner, such as welding. This modular design allows for installation in locations with limited access, such as industrial furnaces, where access doors preclude installation of a single, one-piece element. The fluid flow element modules 10 are pre-sized so that they will fit easily through access doors and install with a close tolerance fit in the plenum/duct opening.

Figure 6:
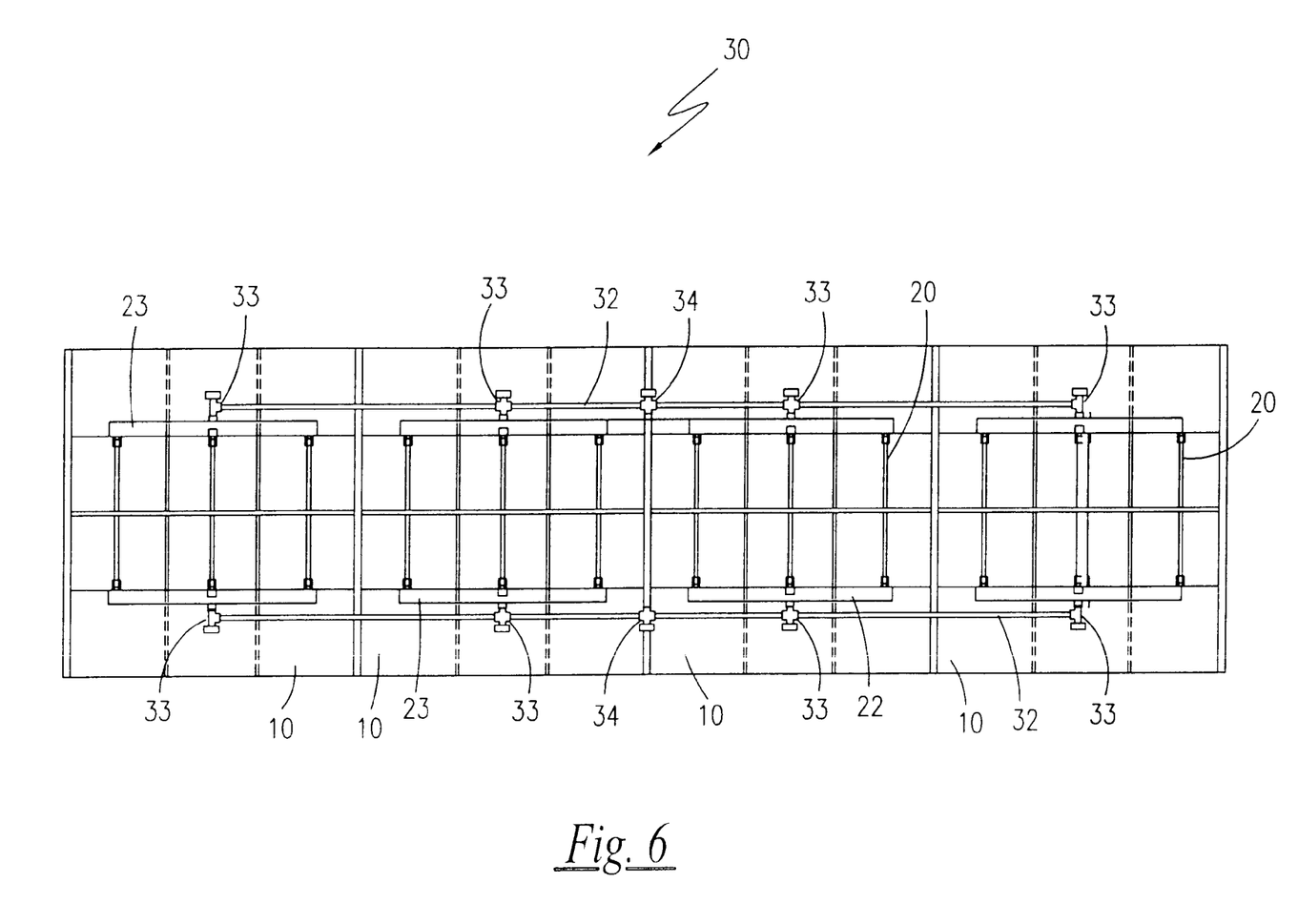
FIG. 6 is a rear elevational view thereof.
Figure 7:
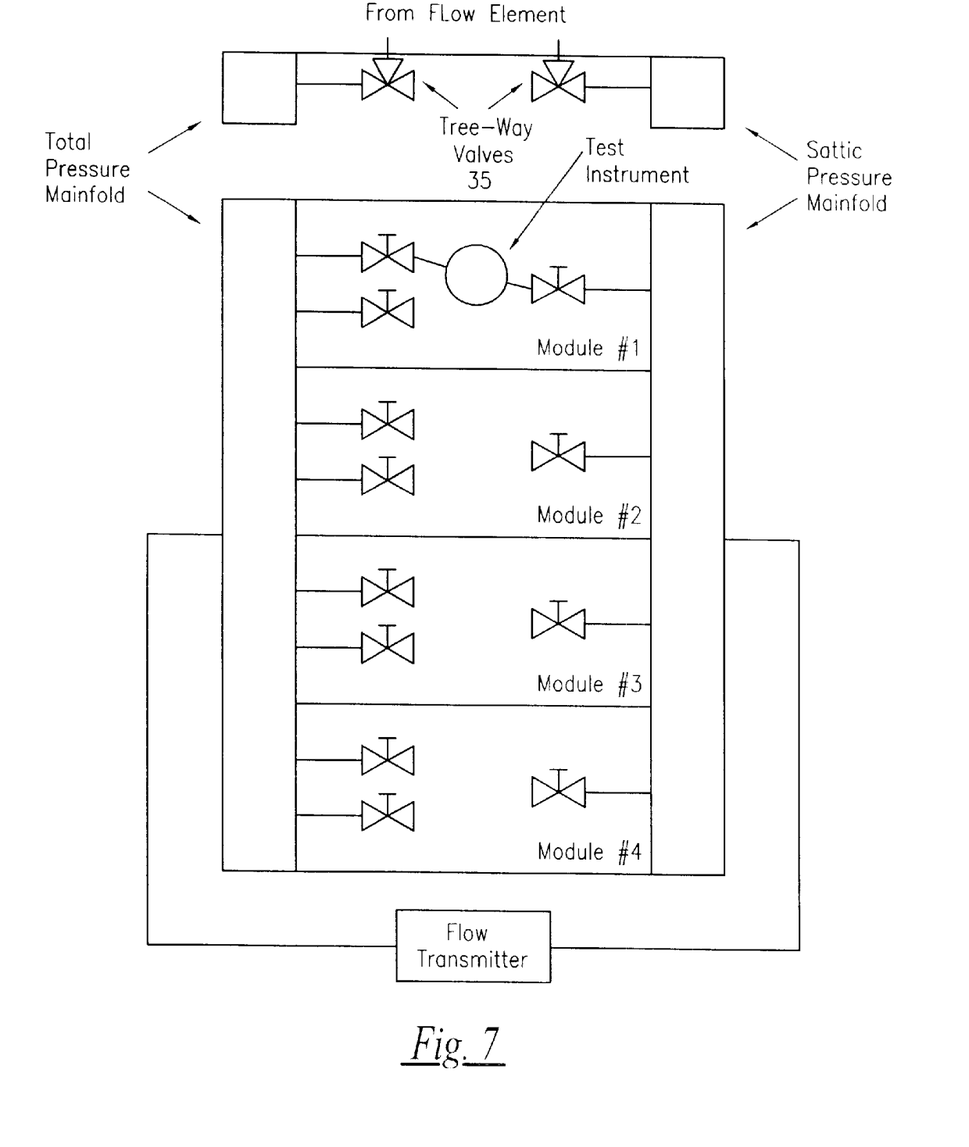
FIG. 7 is a pneumatic flow schematic of a cyclone flow element and calibration manifold utilizing the present invention.

Once the fluid flow element 30 is installed, instrument piping 32 is installed in order to average the total and static pressure readings from the individual fluid flow element modules 10. As seen in FIGS. 6 and 7, tee and elbow type pipe fittings 33 (pipe fittings) are used to connect the total pressure manifolds 23 via instrument piping 32. The piping serves to average the pressure sensed by the individual flow element modules 10. The instrument piping 32 connects to third instrumentation taps 34, providing access to the averaged value. The static pressure sensing Pitot tubes 22 are connected and averaged by instrumentation piping and pipe fittings in a similar manner (not shown).

It is believed that one major advantage of the present invention is that it creates an ability for "in-situ" calibration in an easy, accurate, and efficient manner. To accomplish this, the Pitot traverse tubes are used individually as averaging Pitot tubes to perform a flow calibration after installation, and while the element is in service. By communicating the total pressure traverse tubes 20 and static pressure traverse tubes 22 to the corresponding pressure averaging manifold 23 through a three-way valve 35 located exterior to the windbox, a test pressure port is thereby provided for isolating the manifold while in the testing mode. When closed, the three-way valve 35 would close the test port and direct the traverse tube pressure to the pressure averaging manifold. It is important that this isolation take place when testing the pressure with a test instrument so that the pressure from the traverse tube is the only pressure being measured during this particular "Pitot traverse". The total and static pressure manifolds would each have a common pressure connection to which the main flow measuring instrument would be connected fro measuring the average differential pressure resulting from all of the total and static pressure traverse tubes.

By connecting a sensitive differential pressure instrument to the test port of the three-way valve 35 for one of the total pressure traverse tubes, and to the corresponding static pressure traverse tube three-way valve 35 test port, a differential pressure at that traverse tube in the flow element is obtained. Turning both of the three-way valves 35 back to the manifold position, the differential pressure (flow rate) indication of the total element at the time of the Pitot traverse is provided. This process is continued until a "Pitot traverse" is performed at each of the traverse tube locations. The result is then averaged to indicate total flow. During such a calibration, differential pressure at the flow element differential pressure connections would be constantly measured, thereby either verifying or providing adjustment to the calibration results.

Such an arrangement would allow a user to perform periodic validation of the flow versus differential relationship in an easy, accurate manner without tremendous maintenance costs.

In an alternate embodiment (not shown), the instrument piping is arranged in order to allow for obtaining flow data for each fluid flow element module 10 individually rather than as an average across the entire fluid flow element 30. In this embodiment, valves are used to isolate the differential pressure across a single fluid flow element module 10 from the totalization piping. Once isolated, instrumentation can be used to measure the flow through the single fluid flow element module 10 by attaching the instrument to separate instrument taps (not shown).

In another alternate embodiment (not shown), instrumentation piping averaging is not performed. Rather, each fluid flow element module 10 is equipped with individual flow measurement instruments, thus providing flow values through each module which can be summed to arrive at a total flow value.

While the preferred embodiments of the invention have been shown, illustrated, and described, it will be apparent to those skilled in this field that various modifications may be made in these embodiments without departing from the spirit of the present invention, For that reason, the scope of the invention is set forth in the following claims.

What is claimed is:

1. A high temperature gas flow sensing element module for use within a cyclone furnace having a fluid conduit with a non-circular cross-sectional area and in high-temperature applications, said flow sensing element module comprising:

a housing having an inlet, an outlet, and forming a hollow, non-circular interior cross sectional area, wherein said housing is formed of a plurality of housing subassemblies, each having an inlet, an outlet, and each forming a hollow, non-circular interior cross sectional area;

a total pressure sensing Pitot tube array affixed within said housing traversing the interior cross sectional area of said flow sensing element module for sensing the total pressure of fluid flowing into said flow sensing element module;

a static pressure sensing Pitot tube affixed within said housing and traversing the interior cross sectional area of said flow sensing element module for sensing the static pressure within said flow sensing element module; and exterior instrument taps for fluid communication with said total pressure sensing Pitot tube array and said static pressure sensing Pitot tube, respectively to a differential pressure instrument for indicating flow rate or transmitting a flow rate signal.

2. The high temperature gas flow sensing element module as described in claim 1, wherein said a total pressure sensing Pitot tube array comprises:

a total pressure manifold in fluid communication with said total pressure sensing Pitot tube array;

a plurality of linearly elongated Pitot tubes having a first end and a second end in fluid communication with and anchored at said second end to said total pressure manifold;

a plurality of sensing ports penetrating-each said Pitot tube and directed to face directly toward said inlet, thereby providing free fluid communication between the impacting fluid flowing into said flow element module through the Pitot tube and said total pressure manifold; and a high-temperature tubing connection for affixing said first end of each said Pitot tube to said housing, said high temperature tubing connection comprising a compression fitting.

3. The high temperature gas flow sensing element module as described in claim 2, wherein said total pressure manifold comprises a generally elongated metal tube, with a first end and a second end in fluid communication with each other, penetrated by an axial series of first manifold input holes penetrating into the center of said elongated metal tube and in fluid communication with each other, each said hole then being tapped such as to receive a standard compression tube fittings, and further comprising a first common receiving hole drilled and tapped in a similar manner along the perpendicular face of said elongated metal tube and, in fluid communication with said holes.

4. The high temperature gas flow sensing element module as described in claim 2, wherein said exterior instrument taps are provided to communicate total and static pressure across the individual gas flow sensing element modules to differential pressure flow indicators and transmitting devices.

5. The high temperature gas flow sensing element module as described in claim 2, wherein said a total pressure sensing Pitot tube array further comprises a three-way valve connecting each said second end of said Pitot tube to said total pressure manifold, said three-way valve allowing for the redirection of said Pitot tube from said total pressure manifold to a testing port for in-situ calibration and testing purposes.

6. The high temperature gas flow sensing element module as described in claim 1, wherein said static pressure sensing Pitot tube comprises:

a linearly elongated pressure sensing tube having a first end and a second end in fluid communication with and anchored at said second end to said housing;

a plurality of sensing ports penetrating said pressure sensing Pitot tube and directed to face perpendicular to the flow path across said gas flow sensing Pitot element module; and a high-temperature tubing connection for affixing said first end of said static pressure sensing Pitot tube to said housing, said high temperature tubing connection comprising a compression fitting.

7. The high temperature gas flow sensing element module as described in claim 1, wherein said total pressure sensing Pitot tube array comprises a plurality of individual Pitot tubes arranged across said interior cross sectional area such that traversing patterns formed by the Pitot tubes are placed such that the location of sensing ports are positioned according to formulas recommended by engineering standards organizations.

8. The high temperature gas flow sensing element module as described in claim 2, further comprising pressure averaging piping used to provide average total and static pressure across said housing sub-assemblies to differential pressure flow indicators or transmitting devices, said pressure averaging piping comprising:

instrumentation piping used to connect said total pressure manifolds and said static pressure Pitot tubes on said gas flow sensing element modules;

instrumentation piping that mechanically averages the total and static pressure across said gas flow sensing element; and instrumentation taps that provide said averaged total and static pressures to a differential pressure flow indicators and transmitting devices.

9. The high temperature gas flow sensing element module as described in claim 8, wherein said gas flow sensing element module isolation piping is used to provide flow indication across an individual flow element module or totalized flow indication across an entire flow element to differential pressure flow indicators or transmitting devices, said isolation piping comprising:

instrumentation piping used to connect said total pressure manifolds and said static pressure Pitot tubes on said gas flow sensing element modules combination;

instrumentation piping that mechanically averages the total and static pressure across said gas flow sensing element combination;

instrumentation taps that provide said averaged total and static pressures to a differential pressure flow indicators and/or transmitting devices; and isolation valves used to isolate a single gas flow sensing element module from said pressure averaging piping, thus providing modular total and static pressures to a differential pressure flow indicators and transmitting devices.

* * * * *